April 2, 1968
J. R. HAYDEN
3,375,866
REGENERATOR MATRIX
Filed Nov. 5, 1964
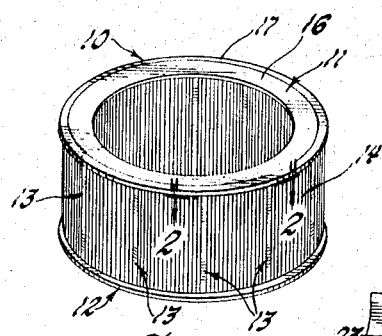
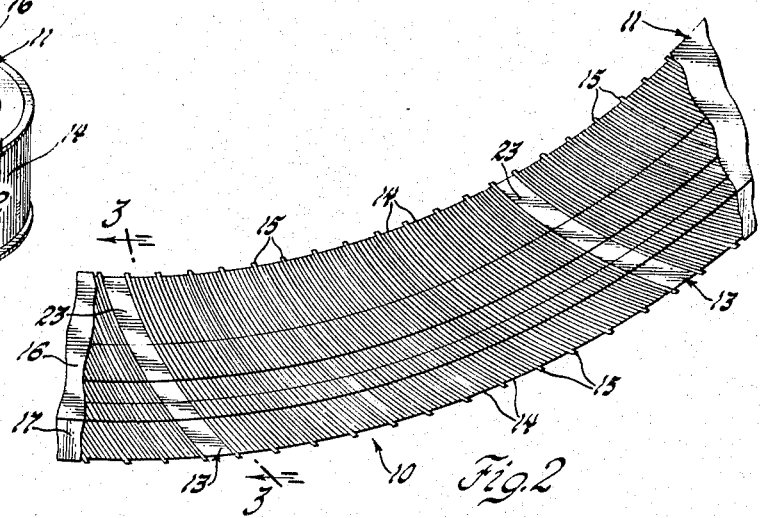
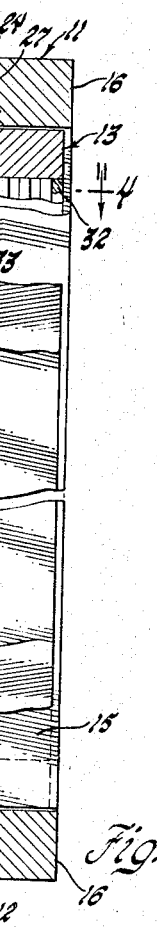
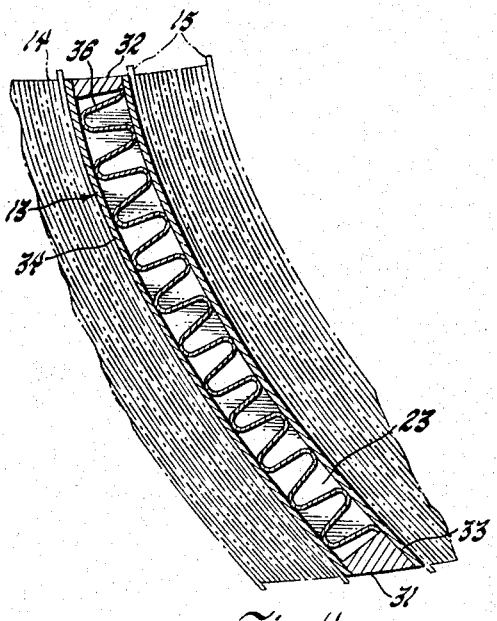
INVENTOR.
John R. Hayden
BY
Paul Fitzpatrick
ATTORNEY

United States Patent Office 3,375,866
Patented Apr. 2, 1968

3,375,866
REGENERATOR MATRIX
John R. Hayden, Lockport, N.Y., assignor to General Motors Corporation, Detroit, Mich., a corporation of Delaware
Filed Nov. 5, 1964, Ser. No. 409,233
1 Claim. (Cl. 165—10)

My invention relates to matrices for rotary regenerators. Such a matrix ordinarily is an annular body which is rotated so that each portion of the matrix passes alternately through two conduits for fluids between which heat transfer is to be effected. The matrix is porous so that the fluids may flow through it. A hot fluid gives up heat to the matrix in one conduit or space and the matrix then surrenders heat to a cooler fluid in the other conduit or space.

My invention is particularly suited to matrices in which the porous heat transfer material is defined by stacks of plate-like elements such, for example, as corrugated sheets or shims, or alternate corrugated and flat sheets, or sheets alternating with wire screen. Whether the matrix is designed for flow of fluid radially through it, that is, generally perpendicular to the axis of rotation; or for axial flow, that is, generally parallel to the axis, the sheetlike elements extend from a smaller radius at the inner boundary of the matrix to a larger radius at the outer boundary of the matrix. Since it is extremely desirable to stack the sheets very tightly, it has been customary to taper the sheets, or some of them, by one expedient or another, or to provide tapered spacers so that the greater circumference at the outer boundary is filled as tightly as the smaller circumference at the inner boundary.

My invention lies in the concept that, by suitably curving the elements of the matrix such as stiffeners, heat transfer sheets, and labyrinth sheets, the stacked elements may remain of constant thickness but the variation in inclination of the elements with radius will cause the space to be equally filled throughout the radial extent of the matrix. The resulting uniformity of density of the matrix improves its heat transfer properties. Also, the slightly longer flow path as compared to a strictly radial disposition of the elements increases heat transfer.

The principal objects of my invention are to make regenerator matrices more efficient, more uniform, and more economical.

The nature of my invention and the advantages thereof will be apparent to those skilled in the art from the succeeding detailed description of the preferred embodiment thereof. By way of background, however, it may be pointed out that Collman et al. U.S. Patent No. 3,077,074 for Regenerative Gas Turbine, issued Feb. 12, 1963, describes a regenerative gas turbine engine including a regenerator in which a matrix such as mine might be employed. Collman et al. U.S. Patent No. 2,937,010 for Regenerative Heat Exchanger, issued May 17, 1960, illustrates a prior art regenerator matrix structure which could be modified in accordance with the principles of my invention.

Preferably, my invention is embodied in structure employing corrugated sheets as the heat storage and transfer material as illustrated in the succeeding drawing in which:

FIGURE 1 is an axonometric view of a radial flow regenerator matrix.

FIGURE 2 is a fragmentary sectional view of the same with parts cut away generally along the plane indicated by the line 2—2 in FIGURE 1.

FIGURE 3 is a cross-sectional view of the matrix taken on a plane inclined to the radius as indicated by line 3—3 in FIGURE 2.

FIGURE 4 is a transverse section of a stiffener plate taken on the plane indicated by the line 4—4 in FIGURE 3.

Referring first to FIGURE 1, the annular radial-flow matrix 10 comprises a first end ring 11 and a second end ring 12, these being coaxial and, in the illustrated embodiment, of the same structure and dimensions. The end rings 11 and 12 are connected by a number of equally spaced stiffeners or stiffener plates 13 which are connected to the rings so as to constitute a sort of squirrel-cage structure. The material which receives, stores, and delivers the heat, which we may refer to as heat transfer material, comprises a multiplicity of sheets 14 and 15 stacked between and generally parallel to the stiffeners 13. The heat transfer material is made of very thin sheet steel so as to transfer heat readily and is so configured as to be highly porous to flow in the radial direction.

Considering now the details of the structure more fully, the end rings 11 and 12 each comprise a main or inner ring 16 to which the stiffener plates are fixed and an outer wear ring or track 17 which is shrunk into place over the ring 16. Ring 16 has a circumferential ridge 18 which is received in a groove in the inner surface of ring 17. Ring 17 may be put in place by heating and allowing it to cool. The ring assembly 16, 17 has two annular recesses or mortises 19 and 21 on its inner face for locating engagement with the stacked elements which lie between the rings. As previously stated, these elements are the stiffener plates 13 and heat transfer sheets 14, 15. Each stiffener plate 13 has a connector block 23 at each end by which it is connected to the ring 16. This block bears two tenons 24 and 26 which extend into the recesses in the ring 16. The two are held assembled by a generally radial pin 27 which is fitted in aligned reamed bores in the ring 16 and connector block 23.

The stiffener plate comprises also an outer edge bar 31 and an inner edge bar 32 which extend between the connector blocks 23, these four elements thus defining a more or less rectangular frame. The stiffener plate also comprises two facings 33 and 34, which are thin metal sheets which are cylindrical in the geometric sense, being of the form generated by a line traveling parallel to itself. It also comprises an internal stiffener 36 which is a corrugated sheet with the corrugations running parallel to the axis of the regenerator and with the peaks engaging the facings 33 and 34. This stiffener structure is preferably assembled by high temperature brazing which creates a unitary structure with all of the parts bonded together. The outer exposed surfaces of the bars 31, 32, as well as the adjacent edges of the facings 33 and 34, are machined to finished dimensions after the brazing operation. The connector blocks 23 must be of a curved configuration to fit between the facings as is apparent in FIGURE 2.

The heat transfer sheets 14 are corrugated sheets of very thin stock; for example, 0.001 inch thick stainless steel, which has herringbone corrugations shown clearly in FIGURE 3. These corrugations are preferably approximately 0.02 inch wide and about 0.008 inch high, in the example illustrated. Alternate sheets have the corrugations oppositely inclined as indicated by sheets 14' and 14" in FIGURE 3 so that the crossing pattern of relatively skewed peaks of the corrugations spaces the heat transfer sheets. The overall outline and general dimensions of these sheets are those of the stiffener plates so that they also have tenons fitting into the mortises in the end rings to locate them.

The matrix also includes labyrinth sheets 15 which may be regarded as a special type of the heat transfer sheet. The labyrinth sheets 15 are of the same shape as sheets 14, except for slightly greater radial dimensions so as to extend beyond the sheets 14 and stiffener plates 13. They are of similar corrugated configuration but preferably, in the example illustrated, 0.005 inch thick rather than 0.001. In the preferred stacking, there is one labyrinth sheet 15 after approximately twenty to twenty-five heat transfer sheets. The labyrinth sheets cooperate with the stationary seals which lie in close contact with the matrix where it passes through the seals between the hot and cold fluid conduits.

The sheets 14 and 15 also are curved in the same way as the stiffener plates illustrated in FIGURE 2. Ideally, this curvature should be that of the involute of a circle so that the thickness of the element in a circumferential direction with respect to the axis increases proportionately to the distance from the axis. Obviously, such a curvature may be approximate rather than exact but, with a reasonable approximation to the involute curvature, the elements will stack properly and will fill the space equally well throughout the radial extent of the matrix. It will be noted that the matrix will have equal density, or porosity, at all radii. Tapered elements are eliminated.

While the invention has been shown as embodied in a radial-flow matrix, it will be apparent that the same principle is applicable to axial-flow matrices in which one edge ring lies at the outer periphery of the axial flow path and the other at the inner boundary of the flow path. In this case, the elements 13, 14, and 15 extend generally radially, but with an involute curvature, from an inner ring or disk to an outer ring.

The detailed description of the preferred embodiment of the invention for the purpose of explaining the principles thereof is not to be considered as limiting or restricting the invention, since modifications may be made by the exercise of skill in the art without departing from the scope of the invention.

I claim:
1. An annular matrix for a rotary regenerator comprising, in combination,
    first and second coaxial rings defining the edges of the matrix,
    means including stiffener elements extending from one ring to the other coupling the rings together, said stiffener elements defining with the rings spaces for heat transfer material,
    and heat transfer material defined by heat transfer elements stacked generally parallel between the said stiffener elements and extending from one ring to the other,
    the heat transfer elements comprising thin plates defining multifarious fluid flow paths between the plates,
    the said stiffener and heat transfer elements being of a generally involute curvature in the plane perpendicular to the axis of the rings so that the angle of inclination of the elements to a radius from the said axis increases with distance from the said axis to such an extent as to make the circumferential thickness of the elements increase substantially proportionally to the radius,
    each stiffener element comprising an external frame of generally rectangular outline,
    two rectangular involute-curved facings, one fixed on each face of the frame,
    and a corrugated sheet internal to the stiffener having the peaks of the corrugations of the sheet alternately engaging the facings and bonded to the facings.

References Cited
UNITED STATES PATENTS

| | | | |
|---|---|---|---|
| 2,937,010 | 5/1960 | Collman et al. | 165—10 |
| 3,015,475 | 1/1962 | Meijer et al. | 165—4 X |
| 3,181,603 | 5/1965 | Bubniak | 165—9 |

FOREIGN PATENTS 957,953   8/1949   France.

ROBERT A. O'LEARY, *Primary Examiner.*

BENJAMIN A. BORCHELT, *Examiner.*

R. F. STAHL, S. W. ENGLE, A. W. DAVIS, R. V. LOTTMANN, *Assistant Examiners.*